(12) United States Patent
Gilmer

(10) Patent No.: US 7,375,144 B2
(45) Date of Patent: May 20, 2008

(54) ABRASION RESISTANT COATINGS

(75) Inventor: John Walker Gilmer, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 202 days.

(21) Appl. No.: 11/160,267

(22) Filed: Jun. 16, 2005

(65) Prior Publication Data

US 2006/0286383 A1 Dec. 21, 2006

(51) Int. Cl.
*C08F 2/48* (2006.01)
*B32B 27/38* (2006.01)

(52) U.S. Cl. ............................ 522/92; 522/90; 522/93; 522/96; 522/100; 522/101; 522/103; 522/104; 522/107; 522/106; 522/170; 522/168; 522/173; 522/153; 522/182; 428/411.1; 428/413; 428/423.1; 428/500; 106/38.2; 106/382.22

(58) Field of Classification Search ................. 522/92, 522/96, 90, 93, 100, 101, 103, 104, 106, 522/107, 168, 170, 173, 153, 182; 106/38.2, 106/38.22; 428/411.1, 413, 414, 423.1, 500
See application file for complete search history.

(56) References Cited

U.S. PATENT DOCUMENTS

| | | | |
|---|---|---|---|
| 2,890,202 A | 6/1959 | Parker | |
| 3,256,226 A | 6/1966 | Fekete et al. | |
| 3,317,465 A | 5/1967 | Doyle et al. | |
| 3,373,221 A | 3/1968 | May | |
| 4,065,587 A | 12/1977 | Ting | |
| 4,271,258 A * | 6/1981 | Watariguchi | 430/284.1 |
| 4,308,119 A | 12/1981 | Russell | |
| 4,416,750 A * | 11/1983 | Murphy et al. | 522/92 |
| 4,425,403 A | 1/1984 | Taniguchi et al. | |
| 4,472,019 A * | 9/1984 | Bishop et al. | 385/128 |
| 4,481,093 A * | 11/1984 | Murphy et al. | 522/79 |
| 4,557,980 A | 12/1985 | Hodnett, III | |
| 4,609,612 A * | 9/1986 | Berner et al. | 430/281.1 |
| 4,801,495 A | 1/1989 | van der Hoeven | |
| 4,927,572 A | 5/1990 | van der Hoeven | |
| 5,045,572 A | 9/1991 | Plotkin et al. | |
| 5,047,261 A | 9/1991 | Moussa et al. | |
| 5,114,783 A | 5/1992 | Hodnett, III | |
| 5,183,831 A * | 2/1993 | Bielat et al. | 522/33 |
| 5,190,845 A | 3/1993 | Hashimoto et al. | |
| 5,204,379 A | 4/1993 | Kubota et al. | |
| 5,213,875 A * | 5/1993 | Su et al. | 428/209 |
| 5,254,395 A | 10/1993 | Hodnett, III | |
| 5,286,547 A | 2/1994 | Tyerman | |
| 5,373,033 A * | 12/1994 | Toh et al. | 522/96 |
| 5,378,735 A | 1/1995 | Hosokawa et al. | |
| 5,401,541 A | 3/1995 | Hodnett, III | |
| 5,453,451 A | 9/1995 | Sokol | |
| 5,470,689 A * | 11/1995 | Wolf et al. | 430/269 |
| 5,476,749 A * | 12/1995 | Steinmann et al. | 430/269 |
| 5,580,647 A | 12/1996 | Larson et al. | |
| 5,800,884 A | 9/1998 | D'Anna et al. | |
| 5,883,212 A | 3/1999 | Bennett | |
| 6,228,133 B1 | 5/2001 | Thurber et al. | |
| 6,261,645 B1 * | 7/2001 | Betz et al. | 427/500 |
| 6,265,132 B1 | 7/2001 | Eramo, Jr. et al. | |
| 6,268,111 B1 | 7/2001 | Eramo, Jr. et al. | |
| 6,284,835 B1 | 9/2001 | Ellison | |

FOREIGN PATENT DOCUMENTS

| | | |
|---|---|---|
| BE | 1006883 | 1/1995 |
| DE | 2910714 | 10/1979 |
| DE | 3940898 | 6/1991 |
| EP | 0439967 | 8/1991 |
| EP | 0505737 | 9/1992 |
| EP | 1 106 627 | 6/2001 |
| GB | 1301890 | 1/1973 |
| JP | 6020972 | 2/1985 |
| JP | 6262832 | 3/1987 |
| JP | 2222902 | 9/1990 |
| JP | 3152181 | 6/1991 |
| JP | 6270350 | 9/1994 |
| JP | 2632874 | 7/1997 |
| JP | 2649799 | 9/1997 |
| JP | 2987887 | 12/1999 |
| WO | WO 92/17337 | 10/1992 |
| WO | PCT/US2006/022704 | 6/2006 |

OTHER PUBLICATIONS

Ebecryl 1290 Aliphatic Urethane Hexaacrylate, Sep. 10, 2002.
Zwanenburg, How to Formulate UV-curing coatings, http:/www.coatings.de/radcure/reading/zwanen.htm.
Modified Epoxy Acrylate Oligomer CN117 Offers Fast Cure, and Abrasion, Chemical, and Scratch Resistance in Coatings; Sartomer Application Bulletin, Apr. 2002.
Non Irritation Acrylates for UV/EB Curing According to European Standards, Sartomer Application Bulletin, Dec. 2004.
Zweifel, Hindered Amine Stabilizer HA(L)S, Plastic Additives Handbood, 4th Edition, pp. 123-136, Hanser Gardner Publications, Inc., Cincinnati, OH, 2001.

* cited by examiner

*Primary Examiner*—Sanza L. McClendon
(74) *Attorney, Agent, or Firm*—Eric D. Middlemas; Louis N. Moreno; Bernard J. Graves, Jr.

(57) ABSTRACT

Disclosed are radiation-curable, abrasion resistant coating compositions for thermoplastic substrates which provides superior abrasion, chemical, and impact resistance properties. The coating composition includes at least one flexible diacrylate component, at least one aromatic diacrylate component, and at least one urethane acrylate. Also disclosed are shaped articles having the coating composition applied to at least one surface and cured by exposure to radiation.

39 Claims, No Drawings

ABRASION RESISTANT COATINGS

FIELD OF THE INVENTION

This invention pertains in general to radiation curable coating compositions. In particular, the invention pertains to coating compositions that form an abrasion resistant, protective finish for thermoplastic articles such as film, sheet, laminates, molded articles, and extruded profiles.

BACKGROUND OF THE INVENTION

Thermoplastic polymers, because of their physical, chemical, and mechanical properties, frequently are used to make shaped articles such as, for example, extruded film, sheet, profiles, formed products, composite structures, and laminates. An important criterion for thermoplastic polymers used in such applications is the ability to maintain a desirable appearance over the lifetime of the article. In particular, it is important for the thermoplastic material to maintain color, clarity, resistance to haze, and to resist scratching by mechanical abrasion. One way to impart abrasion resistance is to coat the article with a tough, hard, and clear coating that resists scratching and hazing from abrasion and rubbing. In addition to abrasion resistance, such a coating generally will provide protection against weathering and chemicals such as, for example, solvents, polishes, and cleaners.

Common coatings that are applied to thermoplastic substrates include various thermoplastic polymers, unsaturated polyesters, epoxy resins, phenolics, melamines, acrylates, urethane-acrylates, rubbers, elastomers, and the like. In order for these coatings to be effective, they should be easy to apply to the thermoplastic article and should not degrade the physical or mechanical properties of the article such as, for example, its strength or toughness. Coating compositions have been developed which, when applied to a substrate and cured, impart a highly abrasion resistant surface to the substrate. For example, abrasion resistant coatings can be prepared from acrylate monomers and cured or crosslinked by radiation. These radiation-curable coatings can exhibit superior hardness, and abrasion and chemical resistance. Radiation curable coatings can be rapidly cured without the use of ovens, and can be applied and processed in the absence of hazardous solvents. Radiation curable coatings also have been used to impart abrasion resistance to plastic lenses such as, for example, eyeglass lenses, to plastic panels and films, and to wood and furniture surfaces.

Although radiation curable coatings are quite hard and resistant to abrasion and scratching, they often can cause cracking and brittle failure of the entire article when subjected to impact. One approach to this brittleness and cracking problem is to use a softening comonomer (a monomer with a low second order transition temperature) to impart some degree of flexibility to the coating. In achieving increased flexibility and reduced brittleness, however, the abrasion resistance of the coating can be reduced. A coating composition for thermoplastic substrates is needed, therefore, that provides excellent abrasion resistance and yet retains good clarity, resistance to impact, and toughness.

SUMMARY OF THE INVENTION

The present invention provides coating composition that produces an abrasion and impact resistant protective finish to a thermoplastic substrate upon curing. The coating composition of the instant invention comprises a urethane acrylate, a flexible component, and an aromatic component in which the flexible component and aromatic component are present in a certain ratio. Thus, in one embodiment, the present invention provides a coating composition for a thermoplastic substrate, comprising:

(A) about 10 to about 60 weight percent of at least one flexible component comprising at least one diacrylate or dimethacrylate ester of a substituted or unsubstituted, linear or branched, diol selected from aliphatic diols containing 3 to 18 carbon atoms, polyalkylene ether glycols containing 3 to 50 carbon atoms, and cycloaliphatic diols containing 4 to 18 carbon atoms;

(B) about 10 to about 60 weight percent of at least one aromatic component comprising at least one diacrylate or dimethacrylate ester of a substituted or unsubstituted, linear or branched, diol having a backbone comprising at least one residue of a bisphenol; and (C) at least one urethane acrylate;

wherein the substituted diols contain 1 to 8 substituents independently selected from halo, hydroxy, oxo, $C_1$-$C_{10}$ alkyl, $C_2$-$C_{10}$ alkenyl, $C_6$-$C_{10}$ aryl, and $C_1$-$C_{10}$ alkoxy, and the composition has a weight ratio of flexible component: aromatic component of about 1:3 to about 3:1. The above weight percentages are based upon the total weight of the composition excluding any additives. The coating composition is curable by thermal means or by radiation, such as, for example, by ultraviolet or electron beam radiation.

In addition to the components described above, the coating composition of the invention, optionally, can further comprise at least one multifunctional acrylate such as, for example, one or more compounds selected trimethylolpropane triacrylate, ethoxylated trimethylolpropane triacrylate, glycerol triacrylate, ethoxylated glycerol triacrylate, propoxylated, pentaerythritol triacrylate, ethoxylated pentaerythritol triacrylate, propoxylated pentaerythritol triacrylate, pentaerythritol tetraacrylate, ethoxylated pentaerythritol tetraacrylate, propoxylated pentaerythritol tetraacrylate, dipentaerythritol hexaacrylate, ethoxylated dipentaerythritol hexaacrylate, and propoxylated dipentaerythritol hexaacrylate. The multifunctional acrylate permits additional crosslinking of the coating and allows for tayloring of the coating properties to meet the requirements of diverse applications.

In another embodiment, the invention provides a coating composition for a thermoplastic substrate comprising:

(A) about 20 to about 50 weight percent of a flexible component comprising at least one diacrylate ester selected from the following: 1,4-cyclohexanedimethanol diacrylate, ethylene glycol diacrylate, diethylene glycol diacrylate, triethylene glycol diacrylate, polyethylene glycol diacrylate, polypropylene glycol diacrylate, dipolypropylene glycol diacrylate, tripolypropylene glycol diacrylate, 1,4-butanediol diacrylate, 1,3-propanediol diacrylate, 2,2-dimethyl-1,3-propanediol diacrylate, 1,6-hexanediol diacrylate, and pentaerythritol diacrylate;

(B) about 15 to about 40 weight percent of an aromatic component comprising at least one bisphenol A epoxy diacrylate;

(C) about 5 to about 20 weight percent of at least one aliphatic urethane acrylate comprising the residues of at least one polyhydroxy compound selected from the following: trimethylolpropane, glycerol, pentaerythritol, and dipentaerythritol; and (D) about 5 to about 25 weight percent of at least one multifunctional acrylate selected from the following: trimethylolpropane triacrylate, ethoxylated glycerol triacrylate, propoxylated glycerol triacrylate, pentaerythritol triacrylate, pentaerythritol tetraacrylate, dipentaerythritol hexaacrylate, propoxylated trimethylol propane triacrylate, and ethoxylated trimethylolpropane triacrylate;

wherein the weight percentages are based on the total weight of the composition, excluding any additives. The coating composition also may comprise additives such as, for example, UV absorbers and hindered amine light stabilizers (abbreviated herein as "HALS") to impart additional weatherability and UV stability.

The novel coating compositions of the present invention may be used advantageously on a wide range of thermoplastic substrates such as, for example, polyesters, polyamides, polycarbonates, cellulosics, and polyolefins, polysulfones, polyacetals, polyimides, and polyketones. The coating composition can be used to coat a shaped article, such as, for example, a sheet, film, bottle, tube, or profile, prepared from one or more thermoplastic polymers. The shaped article may contain one or more layers. In one aspect of the invention, for example, the shaped article comprises a polyester comprising diacid residues which comprise at least 95 mole percent of the residues of terephthalic acid and diol residues which comprise about 10 to about 40 mole percent of the residues of 1,4-cyclohexanedimethanol, about 1 to about 25 mole percent of the residues of diethylene glycol, and about 35 to about 89 mole percent of the residues ethylene glycol. The coated article has enhanced resistance to abrasion and chemicals, excellent clarity, and toughness. Because the coating composition of the invention may be cured by radiation, thermoplastic articles can be cured quickly and at a temperature below the heat deflection temperature of the substrate.

DESCRIPTION OF THE INVENTION

The present invention provides a coating composition for thermoplastic substrates that has enhanced resistance to abrasion and chemical resistance, without compromising other properties such as toughness and clarity. By utilizing radiation to cure these coatings, it is possible to initiate and complete curing in a short period of time while maintaining a temperature well below the heat deflection temperature of the substrate. In a general embodiment, therefore, the instant invention provides a coating composition for a thermoplastic substrate, comprising:

(A) about 10 to about 60 weight percent of at least one flexible component comprising at least one diacrylate or dimethacrylate ester of a substituted or unsubstituted, linear or branched, diol selected from aliphatic diols containing 3 to 18 carbon atoms, polyalkylene ether glycols containing 3 to 50 carbon atoms, and cycloaliphatic diols containing about 4 to 18 carbon atoms;

(B) about 10 to about 60 weight percent of at least one aromatic component comprising at least one diacrylate or dimethacrylate ester of a substituted or unsubstituted, linear or branched, diol having a backbone comprising at least one residue of a bisphenol; and (C) at least one urethane acrylate;

wherein the substituted diols contain 1 to 8 substituents independently selected from halo, hydroxy, oxo, $C_1$-$C_{10}$ alkyl, $C_2$-$C_{10}$ alkenyl, $C_6$-$C_{10}$ aryl, and $C_1$-$C_{10}$ alkoxy, and the composition has a weight ratio of flexible component aromatic component of about 1:3 to about 3:1. The above weight percentages are based upon the total weight of the composition excluding any additives.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Unless indicated otherwise, the weight percentages of the polymerizable monomers and oligomers of the coating composition, as used herein with respect to the written description and the claims, are based upon the total weight of the coating composition and exclude the weight of any additives. The term "additives", as used herein, is intended to have its plain meaning as understood by persons of ordinary skill in the art, that is, a substance introduced into the coating composition or applied to its surface in order to modify or enhance a specific performance characteristic but is not incorporated into the base coating composition by copolymerization with the other coating monomers or oligomers. Representative examples of additives include photoinitiators; slip agents; pigments, leveling agents; wetting agents; adhesion promoters; dispersion aids; anti-blocking agents; anti-caking agents; binders; curing agents; deaerators; diluents; dryers; emulsifiers; fillers; flatting agents; flow control agents; gloss agents; hardeners; lubricants; plasticizers; solvents; stabilizers; surfactants; viscosity modifiers; UV stabilizers; UV absorbers; water repellants, and the like.

As used in the specification and the appended claims, the singular forms "a," "an" and "the" include their plural referents unless the context clearly dictates otherwise. For example, reference a "polymer," or a "shaped article," is intended to include the processing or making of a plurality of polymers, or articles. References to a composition containing or including "an" ingredient or "a" polymer is intended to include other ingredients or other polymers, respectively, in addition to the one named.

The terms "comprising" or "containing" or "including" are understood to mean that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as what is named, unless expressly excluded in the claims.

It is also understood that the mention of one or more method steps does not preclude the presence of additional method steps before or after the combined recited steps or intervening method steps between those steps expressly identified. Moreover, the lettering of process steps or ingredients is a convenient means for identifying discrete activities or ingredients and the recited lettering can be arranged in any sequence, unless otherwise indicated.

The coating composition of the invention comprises about 10 to about 60 weight percent, based on the total weight of the composition, excluding any additives, of at least one flexible component. The flexible component can comprise at least one diacrylate or dimethacrylate ester of a substituted or unsubstituted, linear or branched, diol selected from aliphatic diols containing 3 to 18 carbon atoms, polyalkylene ether glycols containing 3 to 50 carbon atoms, and cycloaliphatic diols containing about 4 to 18 carbon atoms. The substituted diols typically may comprise from 1 to 8 substituents independently selected from halo, hydroxy, oxo, $C_1$-$C_{10}$ alkyl, $C_2$-$C_{10}$ alkenyl, $C_6$-$C_{10}$ aryl, and $C_1$-$C_{10}$ alkoxy. Representative examples of esters that can be used as the flexible component include, but are not limited to, at least one diacrylate or dimethacrylate ester of diethylene glycol; 1,2-propanediol; dipropylene glycol; 1,3-propanediol; 2,2-dimethyl-1,3-propanediol; 1,3-butanediol; decamethylene glycol; 1,4-butanediol; 1,5-pentanediol; 1,6-hexanediol; polyethylene glycol; polypropylene glycol; 2,2,4-trimethyl-1,6-hexanediol; thiodiethanol; 1,3-cyclohexanedimethanol; 1,4-cyclohexanedimethanol; 2,2,4,4-tetramethyl-1,3-cyclobutanediol; triethylene glycol; trimethylolpropane; tripropylene glycol; polycaprolactone diol; polyether polyols having a molecular weight up to about 3000; tetraethylene glycol; 2,2-bis(4-hydroxycyclohexyl)propane; and alkoxide adducts thereof. The diacrylate esters of the cycloaliphatic diols, i.e., 1,3- and 1,4-cyclohexanedimethanol and 2,2,4,4-tetramethyl-1,3-cyclobutanediol, can be present as the pure cis or trans isomer or as a mixture of cis or trans isomers. In one embodiment, for example, the flexible component can comprise at least one diacrylate ester selected from 1,4-cyclohexane-dimethanol diacrylate; ethylene glycol diacrylate; diethylene glycol diacrylate; triethylene glycol diacrylate; polyethylene glycol diacrylate; polypropylene glycol diacrylate; dipolypropylene glycol diacrylate; trimethylolpropane diacrylate; ethoxylated trimethylolpropane diacrylate; propoxylated trimethylolpropane diacrylate; propoxylated neopentyl glycol diacrylate; ethoxylated neopentyl glycol diacrylate; tripolypropylene glycol diacrylate; 1,4-butanediol diacrylate; 1,3-propanediol diacrylate; 2,2-dimethyl-1,3-propanediol diacrylate; 1,6-hexanediol diacrylate; and pentaerythritol diacrylate. In another example, the flexible component comprises 1,6-hexanediol diacrylate (abbreviated herein as "HDDA"). These acrylates are known to persons skilled in the art and some of them are commercially available, for example, under the trade designations SR238, SR306, and SR9003, available from the Sartomer Company.

The coating composition also comprises about 10 to about 60 weight, based on the total weight of the composition excluding any additives, of at least one aromatic component comprising at least one diacrylate or dimethacrylate ester of a substituted or unsubstituted, linear or branched, diol having a backbone comprising at least one residue of a bisphenol. The substituted diols may contain from 1 to 8 substituents independently selected from halo, hydroxy, oxo, $C_1$-$C_{10}$ alkyl, $C_2$-$C_{10}$ alkenyl, $C_6$-$C_{10}$ aryl, and $C_1$-$C_{10}$ alkoxy. The term "bisphenol", as used herein, is understood to mean any methylenediphenol, i.e., $HOC_6H_4CH_2C_6H_4OH$, such as, for example, p,p-methylenediphenol, and their substitution products, which are generally derived from condensation of two equivalent amounts of a phenol with an aldehyde or ketone. The term "residue", as used herein, means any organic structure incorporated into a polymer, oligomer, monomer, ester, or plasticizer that originates from a chemical building block. Thus, for example, the bisphenol residue can be a bisphenol A residue originating from the reaction of bisphenol A with epichlorohydrin to produce the diglycidyl ether of bisphenol A, which may be reacted further with acrylic acid to produce a bisphenol A epoxy acrylate. In addition to bisphenol A (4,4'-isopropylidenediphenol), examples of bisphenols include, but are not limited to bisphenol (p,p-methylenediphenol), bisphenol F (a mixture of 2,2'-, 2,4'-, and 4,4'-dihydroxydiphenylmethane), and bisphenol S (4,4'-dihydroxydiphenylsulfone).

For example, the aromatic component (B) may comprise at least one compound selected from bisphenol A epoxy diacrylates and diacrylate esters of ethoxylated bisphenol, propoxylated bisphenol, ethoxylated bisphenol A, propoxylated bisphenol A, ethoxylated bisphenol F, propoxylated bisphenol F, ethoxylated bisphenol S, and propoxylated bisphenol S. These materials are typically prepared by condensing a bisphenol with one or more equivalents of ethylene or propylene oxide to form an adduct followed by esterification with acrylic acid, methacrylic acid, their corresponding acid chlorides, or anhydrides. These compounds are known to persons skilled in the art and many are commercially available such as, for example, under the trade designations CD540, SR602, and SR349 from Sartomer Company.

The term "bisphenol epoxy acrylate", as used herein, means a compound prepared typically by reacting a diglycidyl ether of a bisphenol with acrylic acid, methacrylic acid or the anhydride of acrylic acid or methacrylic acid. These glycidyl ethers may be oligomerized to form epoxy resins or further modified with diols, diacids, alkylene oxides such as, for example, ethylene oxide or propylene oxide, and then functionalized with acrylic or methacrylic acid, to produce diacrylate or dimethacrylate esters having a range of functionality, hydrophilicity, molecular weights, and viscosities. Bisphenol epoxy acrylates typically do not have any free epoxy groups left from their synthesis but react through their acrylate ester end groups. Typically, the bisphenol epoxy acrylates of the present invention have molecular weights ranging from about 400 to about 1500, but higher or lower molecular weights can be used depending upon the specific coating formulation. These acrylates are well known to persons having ordinary skill in the art and many of them are commercially available. Commercial examples of such compounds include NOVACURE® 3701, EBECRYL® 3500, EBECRYL® 600 (available from UCB Chemicals), and CN117 and CN115 (available from Sartomer Company).

For example, the aromatic component can comprise a bisphenol A epoxy diacrylate modified with at least one alkylene glycol or polyalkylene glycol containing 4 to 20 carbon atoms, one or more aliphatic dicarboxylic acids containing 2 to 20 carbon atoms, or a mixture thereof. In another example, the modified bisphenol epoxy diacrylate comprises the residues at least one aliphatic dicarboxylic acid containing 4 to 8 carbon atoms and propylene glycol. In yet another embodiment, the aromatic component of invention comprises a bisphenol A epoxy diacrylate having the formula:

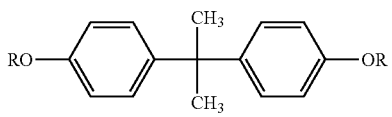

wherein R is a radical having the formula:

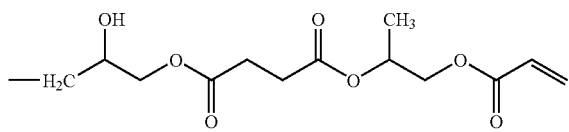

This material is available commercially from UBC Chemicals under the trade designation EBECRYL® 3500.

The novel coating composition of the invention also comprises at least one urethane acrylate. For example, the coating composition of the present invention can comprise about 1 to about 25 weight percent or, or in another example, about 5 to about 20 weight percent of the urethane acrylate, based on the total weight of the composition excluding any additives. Urethanes acrylates are diacrylate esters of hydroxy terminated isocyanate extended polyesters or polyethers. Urethane acrylates and methacrylates are known to the person skilled in the art and can be prepared according to known procedures, for example, by reacting a hydroxy-terminated polyurethane with acrylic acid or methacrylic acid, or by reacting an isocyanate-terminated prepolymer with hydroxyalkyl acrylates or methacrylates. Examples of commercially available urethane acrylates include those known under the trade designations UVITHANE 782, available from Morton Thiokol Chemical, EBECRYL® 6600, EBECRYL® 8400, and EBECRYL® 8805, available from UCB Chemicals.

The urethane acrylate can be an aliphatic urethane acrylate. The term "aliphatic urethane acrylate", as used herein, is intended to have its commonly understood meaning in the art, that of a urethane acrylate prepared from an aliphatic diisocyanate or polyisocyanate, i.e., an diisocyanate in which the isocyanate groups are connected by a aliphatic backbone. In one embodiment, for example, the aliphatic urethane acrylate comprises the residues of at least one polyhydroxy compound selected from trimethylolpropane, glycerol, pentaerythritol, and dipentaerythritol. It is also possible to use one or more hexafunctional urethane acrylates and methacrylates wherein the term "hexafunctional" is understood to mean the acrylate comprises oligomers having 6 acrylate ester groups. Examples of commercially available aliphatic urethane acrylates which can be used in the instant invention include, but are not limited to: EBECRYL® 230, an aliphatic urethane; EBECRYL® 244, an aliphatic urethane & 10% 1,6-hexanediol diacrylate; EBECRYL® 265, an aliphatic urethane & 25% tripropyleneglycol diacrylate; EBECRYL® 270, an aliphatic urethane; EBECRYL® 285, an aliphatic urethane & 25% tripropyleneglycol diacrylate; EBECRYL® 4830, an aliphatic urethane & 10% tetraethyleneglycol diacrylate; EBECRYL® 4833, an aliphatic urethane & 10% N-vinyl-2-pyrrolidone; EBECRYL® 4834, an aliphatic urethane & 10% N-vinyl-2-pyrrolidone; EBECRYL® 4881, an aliphatic urethane & 10% tetraethyleneglycol diacrylate; EBECRYL® 4883, an aliphatic urethane & 15% tripropyleneglycol diacrylate; EBECRYL® 8803-20R, an aliphatic urethane & 20% tripropyleneglycol diacrylate & 8% 2-(2-ethoxyethoxy)ethyl acrylate; EBECRYL® 1290, and EBECRYL® 8803. These products are available from UCB Chemicals.

Typically, the flexible component (A) and the aromatic component (B) are each present in the coating composition at about 15 weight percent to about 55 weight percent based on the total weight of the composition excluding any additives. In another example, the coating composition can comprise about 20 weight percent to about 50 weight percent each of the flexible component (A) and aromatic component (B). The ratio by weight of the flexible component to the aromatic component desirably can be from about 1:3 to about 3:1. In another example, the weight ratio of the flexible: aromatic component can be about 1:2 to about 2:1. In yet another example the weight ratio can be from about 1:1.5 to about 1.5:1.

To enhance crosslinking and hardness of the cured coating, the inventive coating composition may further comprise at least one multifunctional acrylate having 3 or more acrylate ester groups. Non-limiting examples of multifunctional acrylates include trimethylolpropane triacrylate, ethoxylated or propoxylated trimethylolpropane triacrylate, glycerol triacrylate, ethoxylated glycerol triacrylate, propoxylated glycerol triacrylate, pentaerythritol triacrylate, ethoxylated pentaerythritol triacrylate, propoxylated pentaerythritol triacrylate, pentaerythritol tetraacrylate, ethoxylated pentaerythritol tetraacrylate, propoxylated dipentaerythritol hexaacrylate, ethoxylated dipentaerythritol hexaacrylate, and propoxylated dipentaerythritol hexaacrylate. In one embodiment, for example, the multifunctional acrylate comprises at least one ethoxylated trimethylolpropane triacrylate containing 3 to 20 ethoxy groups.

The coating composition also may comprise various additives as needed to alter or enhance certain properties such as, for example, to improve weatherability, components to improve abrasion resistance, additives to enhance appearance, and materials to improve toughness and mechanical properties. Examples of additives that may be used in the coating composition of the present invention include, but are not limited to, photoinitiators; slip agents; leveling agents; wetting agents; adhesion promoters; anti-absorption agents; anti-foaming agents, such as, for example, mixtures of foam destroying polymers and polysiloxanes; accelerators; pigment dispersion aids; anti-blocking agents; anti-caking agents; anti-slip agents; anti-skinning agents; anti-static agents; anti-stripping agents; binders; curing agents; deaerators; diluents; dispersants; dryers; emulsifiers; fillers; flatting agents; flow control agents; gloss agents; hardeners; lubricants; mar resistance aids; whiteners; plasticizers; solvents; stabilizers; surfactants; viscosity modifiers; UV stabilizers; UV absorbers; and water repellants. For example, the coating composition may further comprise finely divided $SiO_2$, $Al_2O_3$, $ZrO_2$, or $TiO_2$ dispersed therein. These materials can modify the viscosity of the coating such that it may be applied easily and can enhance the abrasion resistance of the cured coating. As an example, the $SiO_2$ may comprise amorphous silica particles having an average surface area of 50 $m^2/g$, and an average particle size of 40 μm. In another example, the $SiO_2$ can be a colloidal silica.

While curing or polymerization of the coating composition of the invention can be achieved thermally, it is advantageous to cure the coating composition by radiation. It is understood by those skilled in the art that radiation curable coatings, although primarily cured by radiation energy, also may be cured or their cure accelerated by heating. Curing may be initiated by any source of ionizing radiation capable of producing free radicals, including gamma radiation, infrared, microwave, but more typically by electron beam or ultraviolet radiation. In one embodiment, for example, the coating composition is cured by exposure to ultraviolet radiation, typically in the 200-400 nm wavelength range. When polymerization is initiated by ultraviolet radiation, the coating composition will typically include a photoinitiator in accordance with known practices for UV curable compositions. Exemplary photoinitiators include, but are not limited to, those selected from organic peroxides, azo compounds, quinones, α-hydroxy ketones, benzophenones, nitroso compounds, acyl halides, hydrazones, mercapto compounds, pyrylium compounds, triacylimidazoles, bisimidazoles, chloroalkyltriazines, benzoin ethers, benzil ketals, thioxanthones, and acetophenone derivatives, and mixtures thereof. Some additional, representative examples of photoinitiators that may be used in the coating composition of the invention include one or more compounds selected from the following: 2,2-dimethoxy-1,2-diphenyl-1-ethanone; 2-hydroxy-2-methylpropiophenone; benzoin methyl ether; benzoin ethyl ether; benzoin isopropyl ether; benzoin phenyl ether; benzoin acetate; acetophenone; 2,2-dimethoxyacetophenone; 4-(phenylthio)acetophenone; 1,1-dichloroacetophenone; benzil; benzil dimethyl ketal; benzil diethyl ketal; 2-methylanthraquinone; 2-ethylanthraquinone; 2-tertbutylanthraquinone; 1-chloroanthraquinone; 2-amylanthraquinone; 2,4,6-trimethylbenzoyidiphenylphosphine oxide; benzophenone; 4,4'-bis(N,N'-dimethylamino)benzophenone; thioxanthones; 1-phenyl-1,2-propanedione-2-O-benzoyloxime; 1-aminophenyl ketones; 1-hydroxycyclohexyl phenyl ketone; phenyl (1-hydroxyisopropyl)ketone, 4-isopropylphenyl(1-hydroxyisopropyl)ketone; and chloroalkyl-S-triazines. Further examples of commercially available photoinitiators which may be used include 1-hydrocyclohexyl phenyl ketone (IRGACURE® 184, available from Ciba Specialty Chemicals), 2-hydroxy-2-methylpropiophenone (DAROCUR® 1173, available from Ciba Specialty Chemicals), and 2,2-dichloro-1-(4-phenoxyphenyl) ethanone, and the like. When a photoinitiator is used, it is typically present from about 0.1 to about 5 weight percent based on the total weight of the coating composition. In another example the photoinitiator is present from about 0.5 to about 5 weight percent, based on the total weight of the composition.

Another embodiment of the invention is a coating composition for a thermoplastic substrate, comprising:

(A) about 20 to about 50 weight percent of a flexible component comprising at least one diacrylate ester selected from the following: 1,4-cyclohexanedimethanol diacrylate, ethylene glycol diacrylate, diethylene glycol diacrylate, triethylene glycol diacrylate, polyethylene glycol diacrylate, polypropylene glycol diacrylate, dipropylene glycol diacrylate, tripropylene glycol diacrylate, 1,4-butanediol diacrylate, 1,3-propanediol diacrylate, 2,2-dimethyl-1,3-propanediol diacrylate, 1,6-hexanediol diacrylate, and pentaerythritol diacrylate;

(B) about 15 to about 40 weight percent of an aromatic component comprising at least one bisphenol A epoxy diacrylate;

(C) about 5 to about 20 weight percent of at least one aliphatic urethane acrylate comprising the residues of at least one polyhydroxy compound selected from the following: trimethylolpropane, glycerol, pentaerythritol, and dipentaerythritol; and (D) about 5 to about 25 weight percent of at least one multifunctional acrylate selected from the following: trimethylolpropane triacrylate, ethoxylated glycerol triacrylate, propoxylated glycerol triacrylate, pentaerythritol triacrylate, pentaerythritol tetraacrylate, dipentaerythritol hexaacrylate, propoxylated trimethylolpropane triacrylate, and ethoxylated trimethylolpropane triacrylate;

wherein the weight percentages are based on the total weight of the composition excluding any additives. The various aspects of the flexible component, aromatic component, urethane acrylate, multifunctional acrylates, additives, and photoinitiators are as described hereinabove. For example, in one embodiment, the composition can comprise (A) about 20 to about 40 weight percent of a flexible component comprising dipropylene glycol diacrylate and 1,6-hexanediol diacrylate; (B) about 15 to about 40 weight percent of a bisphenol A epoxy acrylate modified with at least one alkylene glycol or polyalkylene glycol containing 4 to 20 carbon atoms, one or more aliphatic dicarboxylic acids containing 4 to 20 carbon atoms, or a mixture thereof; (C) about 5 to about 15 weight percent of at least one aliphatic urethane acrylate comprising the residues of pentaerythritol; and (D) about 5 to about 20 weight percent of a multifunctional acrylate comprising ethoxylated trimethylolpropane triacrylate containing 3 to 20 ethoxy groups. In one embodiment, as described previously, the modified bisphenol A can have the formula:

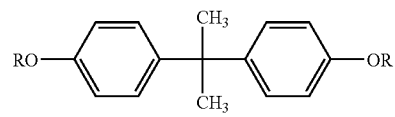

wherein R is a radical having the formula:

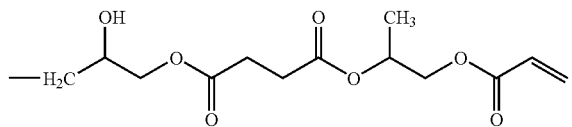

In another example, the composition may further comprise a photoinitiator. Typical examples of photoinitiator levels are about 0.1 to about 5 weight percent, or preferably, about 0.5 to about 5 weight percent, based on the total weight of the composition. The coating composition also may further comprise $SiO_2$ dispersed therein.

Although not critical to the invention, one or more light stabilizers, such as UV absorbers and reversible radical scavengers such as, for example, hindered amine ("HALS") or hindered phenol light stabilizers also may be added to the coating composition to enhance weatherability and inhibit yellowing. Such UV absorbers and light stabilizers are known to persons skilled in the art and many are commercially available. While not limiting, the hindered amine light stabilizers can have a high molecular weight such as, for example, those compounds having an N-substituted piperidinol nucleus and generally having a weight average molecular weight of about 400 to about 10,000 or, preferably, about 500 to about 5,000. Such hindered amine light stabilizers include high-molecular weight esters prepared from butanetetracarboxylic acid and an N-substituted piperidinol. The amount of the light stabilizer, while varying according to the kind, generally ranges from about 0.5 to about 5 weight percent, based on the total weight of the coating composition. Further examples of weight percentage ranges for the light stabilizer are about 0.6 to about 4 weight percent and about 0.7 to about 3 weight percent. Examples of commercially available hindered amine light stabilizers that can be used in the invention include, but are not limited to: CYASORB™ UV-3529 (available from Cytec Industries), TINUVIN™ 770 (available from Ciba Specialty Chemicals), TINUVIN™ 123 (available from Ciba Specialty Chemicals), CHIMASSORB™ 119 (available from Ciba Specialty Chemicals), LOWILITE™ 76 (available from Great Lakes Chemical Corp.), MARK™ LA 52 (available from Asahi Denka Co., Ltd.), MARK™ LA 62 (available from Asahi Denka Co., Ltd.), GOODRITE™ UV-3159 (available from BF Goodrich Chemical Co.), MARK™ LA-63 (available from Adeca Argus), MARK™ LA-62 (available from Adeca Argus), and TINUVIN®-622LD (available from Ciba-Geigy (Japan) Ltd.). Additional examples hindered amine light stabilizers that can be used are listed in the Plastic Additives Handbook 5th Edition (Hanser Gardner Publications, Inc., Cincinnati, Ohio, USA, 2001).

Typically, one or more UV absorbers may be added in an amount of about 0.5 to about 10 weight percent, preferably about 0.7 to about 9 weight percent, still preferably about 1 to about 8 weight percent, based on the total weight of the coating composition. Representative UV absorbers that can be added to the coating composition of the invention include, but are not limited to, one or more compounds having a maximum absorption in the range of 290-400 nm with a minimal absorbance between 400 and 700 nm. For example, UV absorbers of cyanoacrylate type, benzotriazole type, aromatic triazine type, benzoxazinone type, benzophenone type, salicylic acid type, or hydroquinone type can be used. Representative benzotriazole UV absorbers include, but are not limited to, 2-(3,5-di-t-butyl-2-hydroxyphenyl) benzo-triazole, 2-[2-hydroxy-3,5-bis(alpha,alpha-dimethylbenzyl)phenyl]-2H-benzotriazole, and 2-(3,5-di-t-amyl-2-hydroxyphenyl]-benzotriazole. Examples of benzophenone UV absorbers include, but are not limited to, 2-hydroxy-4-octyloxybenzophenone, 2,4-dihydroxybenzophenone, and 2-hydroxy-4-methoxy-2'-carboxybenzophenone. Examples of salicylic acid UV absorbers include, but are not limited to, phenyl salicylate, p-octylphenyl salicylate, resorcinol monobenzoate, and 4-t-butylphenyl salicylate. Examples of cyanoacrylate UV absorbers include ethyl 2-cyano-3,3-diphenylacrylate and 2-ethylhexyl-2-cyano-3,3-diphenylacrylate. Examples of commercially available UV absorbers include, but are not limited to, CYASORB™ UV-1164 (available from Cytec Industries) and TINUVIN™ 1577 (available from Ciba Specialty Chemicals).

The present invention also provides a shaped article comprising the coating compositions described hereinabove, applied to at least one surface thereof, and cured by exposure to ultraviolet or electron beam radiation. The shaped article such as, for example, a sheet, film, tube, bottle, or profile, may be produced by extrusion, calendering, thermoforming, blow-molding, injection molding, casting, tentering, or blowing. The shaped article may comprise one or more layers.

Typically, the shaped article will comprise at least one thermoplastic polymer selected from the following: polyester, polyamide, polycarbonate, cellulosic, polyolefin, polysulfone, polyacetal, polyimide, polyketone, polyvinyl chloride, polystyrene, polylactic acid, copolymers thereof, and blends thereof. The term "thermoplastic" as used herein with respect to the polymers of the shaped articles, it intended have its commonly understood meaning in the art, that is a property of a polymer wherein the polymer softens when exposed to heat and returns to its original condition when cooled to room temperature. In one example, the shaped article may comprise one or more polyesters such as, for example, poly(ethylene terephthalate), poly(butylene terephthalate), poly(1,3-trimethylene terephthalate), poly(cyclohexylene terephthalate). In addition to the polyesters noted above, the shaped articles of the invention may include polyesters from the condensation one of more aromatic diacids with one or more diols. The term "polyester", as used herein, is intended to include "copolyesters" and is understood to mean a synthetic polymer prepared by the polycondensation of one or more difunctional carboxylic acids with one or more difunctional hydroxyl compounds. Typically the difunctional carboxylic acid is a dicarboxylic acid and the difunctional hydroxyl compound is a dihydric alcohol such as, for example, glycols and diols. Alternatively, the difunctional carboxylic acid may be a hydroxy carboxylic acid such as, for example, p-hydroxybenzoic acid, and the difunctional hydroxyl compound may be an aromatic nucleus bearing 2 hydroxy substituents such as, for example, hydroquinone. Thus, the dicarboxylic acid residue may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The polyesters of present invention comprise dicarboxylic acid residues, diol residues, and repeating units. A "repeating unit", as used herein, means an organic structure having a dicarboxylic acid and a diol residue bonded through a carbonyloxy group. The polyesters of the present invention are prepared from the reaction of one or more diols with one or more dicarboxylic acids and contain substantially equal molar proportions of acid residues (100 mole %) and diol residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 30 mole % isophthalic acid, based on the total acid residues, means the polyester contains 30 mole % isophthalic acid out of a total of 100 mole % acid residues. Thus, there are 30 moles of isophthalic acid among every 100 moles of acid residues. In another example, a polyester containing 30 mole % ethylene glycol, based on the total diol residues, means the polyester contains 30 mole % ethylene glycol out of a total of 100 mole % diol residues. Thus, there are 30 moles of ethylene glycol among every 100 moles of diol residues. In a third example, a polyester containing 30 mole % of a monomer, which may be a dicarboxylic acid, a diol, or hydroxycarboxylic acid, based on the total repeating units, means that the polyester contains 30 mole % monomer out of a total of 100 mole % repeating units. Thus, there are 30 moles of monomer residues among every 100 moles of repeating units.

Examples of polyesters include those comprising (i) diacid residues comprising at least 80 mole percent, based on the total moles of diacid residues, of the residues of one or more dicarboxylic acids selected from: terephthalic acid, naphthalenedicarboxylic acid, 1,4-cyclohexanedicarboxylic acid, and isophthalic acid; and (ii) diol residues comprising 3 to 100 mole percent, based on the total moles of diol residues, of the residues of one or more diols selected from: 1,4-cyclohexanedimethanol, neopentyl glycol, and diethylene glycol; and 0 to 97 mole percent of one or more residues selected from: ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, and polyalkylene glycol. The 1,3- and 1,4-cyclohexanedimethanol, and 2,2,4,4-tetramethyl-1,3-cyclobutanediol may be used as a pure cis or trans isomer or as a mixture of cis and trans isomers. The polyesters generally will have inherent viscosity (I.V.) values in the range of about 0.5 dL/g to about 1.4 dL/g. Additional examples of I.V. ranges include about 0.65 dL/g to about 1.0 dL/g and about 0.65 dL/g to about 0.85 dL/g. The inherent viscosity is measured at 25° C. using 0.25 gram of polymer per 50 mL of a solvent composed of 60 weight percent phenol and 40 weight percent tetrachloroethane. Typically, these copolyesters have a glass transition temperature between about 35° C. and about 150° C.

In one example, the shaped article can comprise a polyester having diacid residues comprising at least 95 mole percent of the residues of terephthalic acid and diol residues comprising about 10 to about 40 mole percent of the residues of 1,4-cyclohexanedimethanol, about 1 to about 25 mole percent of the residues of diethylene glycol, and about 35 to about 89 mole percent of the residues ethylene glycol. In another example, the diacid residues can comprise from about 60 to 100 mole percent terephthalic acid and 0 to about 40 mole percent isophthalic acid.

The polyesters of the present invention are prepared by procedures known to persons skilled in the art. For example, the polyesters of the instant invention are readily prepared from the appropriate dicarboxylic acids, esters, anhydrides, or salts, and the appropriate diol or diol mixtures using typical polycondensation reaction conditions. They may be made by continuous, semi-continuous, and batch modes of operation and may utilize a variety of reactor types such as, for example, stirred tank, continuous stirred tank, slurry, tubular, wiped-film, falling film, or extrusion reactors. The reaction of the diol and dicarboxylic acid may be carried out using conventional polyester polymerization conditions or by melt phase processes, but those with sufficient crystallinity may be made by melt phase condensation followed by solid phase polycondensation techniques. For example, when preparing the polyester by means of an ester interchange reaction, i.e., from the ester form of the dicarboxylic acid components, the reaction process may comprise two steps. In the first step, the diol component and the dicarboxylic acid component, such as, for example, dimethyl terephthalate, are reacted at elevated temperatures. Thereafter, the reaction product is heated under higher temperatures and under reduced pressure to form the polyester with the elimination of diol, which is readily volatilized under these conditions and removed from the system. This second step, or polycondensation step, is continued under higher vacuum and temperatures until a polymer having the desired degree of polymerization, as determined by inherent viscosity, is obtained. The reaction rates of both stages are increased by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed. In the preparation of polyester by direct esterification, i.e., from the acid form of the dicarboxylic acid component, polyesters are produced by reacting the dicarboxylic acid or a mixture of dicarboxylic acids with the diol component or a mixture of diol components.

To ensure that the reaction of the diol component and dicarboxylic acid component by an ester interchange reaction is driven to completion, it is sometimes desirable to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

The cured coating composition of the present invention show excellent abrasion resistance and excellent resistance to methyl ethyl ketone (abbreviated herein as "MEK") yet while maintaining a ductile mode of failure in a reverse-sided, instrumented impact test. For example, the shaped article can be a sheet or film having the coating composition of the invention coated and cured thereon. Typically, this sheet or film will have a haze value of 20% or less after 100 cycles in accordance with ASTM procedure D1044. In another example, the sheet or film can exhibit a haze value of 15% or less after 100 cycles in accordance with ASTM procedure D1044. The shaped article also can exhibit excellent chemical and solvent resistance as exemplified after 300 methyl ethyl ketone double rubs in accordance with ASTM Procedure D3732.

The present invention also provides a method of coating a shaped article comprising applying the coating compositions described hereinabove to a surface of a shaped article and exposing the coated surface to radiation. The coating compositions are prepared by mixing the appropriate monomers, resins and additives in the desired proportions described above. Coating can be achieved by conventional techniques, including dipping, spraying, curtain coating, gravure and roll coating. The application methods are conventional and may be selected depending upon the nature of the substrate, desired thickness, and other factors. In one embodiment of the invention, for example, the coating is applied by using conventional gravure or roll coating techniques which produce thin coatings. Multiple coating layers may be applied to the substrate in a conventional manner as described above. For example, each respective coating layer may be applied individually to the substrate and cured prior to application of the next coating layer.

As described hereinabove, the coating composition may be cured by thermal means, by radiation, or a combination thereof. Typically, conventional radiation curing techniques are employed in the present invention using any source of radiation capable of initiating photochemical reactions such as, for example, ultraviolet or electron beam radiation.

Potential commercial applications of the coating composition of the invention include a variety of areas where the appearance of the plastic form or object is an important factor in its selection in use. These include flat sheet applications in areas such as building and construction, transportation, laminates, graphic arts, EILT (Encapsulated Image Layer Technology), appliances, point of purchase displays, sports, and recreation. In other application areas the coating can be applied and cured after an object has been molded such as, for example, in ophthalmic and cosmetic applications. The invention is further illustrated and described by the following examples.

EXAMPLES

Example 1

A uniform mixture of materials was prepared using the materials listed in Table 1. The weight percentages are calculated based on the total weight of the composition excluding the weight of any additives (e.g., $SiO_2$ and the DAROCUR photoinitiator).

TABLE 1

| Materials | Wt (grams) | Monomer Wt % |
|---|---|---|
| NANOCRYL ® 21/0768 (50 wt % $SiO_2$ and 50 wt % HDDA) | 6.75 g $SiO_2$ 6.75 g HDDA (13.50 g total) | 36.6 (HDDA only) |
| Ethoxylated trimethylol-propane triacrylate | 2.19 | 11.9 |
| EBECRYL ® 3500 | 6.75 | 36.6 |
| EBECRYL ® 1290 | 2.75 | 14.9 |
| DAROCUR ® 1173 | 0.55 | |

NANOCRYL® XP 21/0768, available from Hanse Chemie, was specified by the manufacturer as containing 50 wt % $SiO_2$ dispersed in a 50 wt % 1,6-hexanediol diacrylate ("HDDA") matrix. Ethoxylated trimethylolpropane triacrylate, EBECRYL® 3500, and EBECRYL® 1290 are available from UCB Chemicals. DAROCUR® 1173 is available from Ciba Specialty Chemicals. EBECRYL® 3500 was described by UCB Chemicals as a low viscosity difunctional, modified bisphenol-A epoxy acrylate. EBECRYL® 1290 was described by UCB Chemicals as a hexafunctional aliphatic urethane acrylate with an acrylated polyol diluent. The DAROCUR® 1173 initiator was described as 2-hydroxy-2-methylpropiophenone.

The components of the formulation were each weighed out in an opaque NALGENE® container. The formulation was then mixed by placing the container for at least 2 hours on a roller which was located in a heated chamber at a temperature of approximately 55° C. The container was then placed on a roller in the laboratory and allowed to roll overnight to insure that the formulation was well mixed. The coatings were applied to ⅛ inch thick sheet prepared from a 70:30 (by weight) polyester:polycarbonate blend. The polyester component of the blend contained about 100 mole % terephthalic acid, 62 mole % 1,4-cyclohexanedimethanol, and 38 mole % ethylene glycol. The coatings were applied using the RK automated draw down machine (Print-Coat Instruments, Ltd., England). A wire-wound rod with a very fine wound spring was used to draw a coating of approximately 5 microns wet film thickness. The speed of draw was set at "4".

The coated substrates were cured by passing them through a Fusion Model HP-6 High Power Six-inch Ultraviolet Lamp System, using a belt speed of 24 ft/min and a power setting of 70% (of 500 Watts) with the "H" bulb to provide a dose of 1.1 $J/cm^2$. Before each use, the machine was characterized with a radiometer, a UV Power Puck™ (available from EIT Instruments). The Power Puck™ measures the total UV dosage (Joules/$cm^2$) and the peak UV intensity (watts/$cm^2$) for four UV ranges (UV-A: 320-390 nm, UV-B: 280-320 nm, UV-C: 250-260 nm, and UV-V: 395-445 nm). The following total peak UV readings were observed for the settings used in this experiment: UV-A 1.6, UV-B 1.5, UV-C 0.18, and UV-V 1.1.

Evaluation of the coatings—Initial Coating Characterization. The degree of cure of the coatings were verified to be acceptable using a Kbnig Hardness test (ASTM D 4366). A crosshatched adhesion test was carried out according to ASTM D3359. The coating is scored with a razor knife 11 times horizontally and 11 times vertically (creating 100 squares). Next, a piece of masking tape is adhered to the scored surface and then removed. The percent adhesion is then determined by counting the number of squares which remain adhered to the substrate. Example 1 showed 100% adhesion to polyester substrate.

Chemical resistance. The MEK Double Rub test was conducted on an instrument where the head of a ball peen hammer is covered with 16 folds of cheesecloth saturated in MEK. The covered hammer head was rubbed 50 times over the surface of the coated sample. The instrument was then stopped, the coating was examined, and the cheesecloth was re-saturated with MEK. After the completion of 300 rubs, the test was complete. The Example 1 coating tested in the MEK Double Rub test remained intact for 300 rubs, exemplary of excellent chemical resistance.

Abrasion Resistance—The Taber Abrasion Test ASTM D1044 was conducted for each of the acrylic coatings applied to the polyester sheet to analyze its resistance to abrasion. This test is generally accepted and recognized as a standard method for characterizing the ability of coated plastic sheet to resist scratching and abrasion. When this test is used for this purpose, the percent haze of a plastic sheet is usually measured over a range of 0 to 500 abrasive cycles, with a total weight of 500 grams on CS-10F type wheels. A lower level of haze is indicative of greater resistance to abrasion.

For each coating, three replicates were run. Each coated panel was divided into quarters, to define a specific region for each of four haze measurements. After an initial measurement of haze, the panels were subjected to a specific number of abrasion cycles followed by a haze determination. To map out the dependence of the haze level on the number of abrasive cycles for each sample, this process was repeated until the panels have undergone a total of 500 cycles of abrasion. The Taber Abrasion results for the coated polyester sheet samples are presented in the Table 2:

TABLE 2

| | Number of Cycles | | | | |
|---|---|---|---|---|---|
| | 0 | 50 | 100 | 200 | 500 |
| Percent Haze | 0.61 | 1.03 | 1.26 | 1.57 | 2.09 |

Toughness and ductility—To test the ductility and toughness of each coated sheet sample, a reverse sided instrumented impact test was employed using ASTM Method D-3763. A reverse sided configuration was utilized, with the coated side placed down, away from the side being impacted by the falling tup. In this manner, the coating was placed in tension during failure. This sample orientation results in a more accurate assessment of whether the presence of the coating on the surface of the sheet will cause a brittle or ductile failure when in use. In the instrumented impact test, the tup was weighted with a mass of 26.202 kg and was released from a height of 0.756 m. 5 samples were tested for example 1: all 5 samples exhibited ductile failure with an average fracture energy of 41.9 ft. lbs.

Examples 2, 3, 4, and 5

Examples 2, 3, 4, and 5 were prepared, coated, cured, and analyzed as described in Example 1. The composition of these examples is described in Table 3. As described in Example 1, the weight percentages of the polymerizable monomers and oligomers, which are provided in parentheses, are calculated based on the total weight of the composition excluding the weight of any additives, e.g., $SiO_2$ and the photoinitiator. The weight percent values for NANOCRYL® XP 21/0768, therefore, represent only the 1,6-hexanediol diacrylate component; the $SiO_2$ component of NANOCRYL® XP 21/0768 was not included in the weight percentage calculations. Similarly, the weight of the DAROCUR® 1173 photoinitiator also was excluded from the weight percentage calculations.

TABLE 3

| Monomer | Example 2 gm (wt %) | Example 3 gm (wt %) | Example 4 gm (wt %) | Example 5 gm (wt %) |
|---|---|---|---|---|
| EBECRYL ® 1290 | 2.15 g (11 wt %) | 2.32 g (11 wt %) | 2.52 g (11 wt %) | 2.75 g (11 wt %) |
| EBECRYL ® 3500 | 7.24 g (38 wt %) | 7.81 g (38 wt %) | 8.47 g (38 wt %) | 9.25 g (38 wt %) |
| NANOCRYL ® XP 21/0768 (50 wt % SiO$_2$/50 wt % HDDA) | 10.86 g (5.43 g, 28 wt % HDDA) | 7.81 g (3.91 g, 19 wt % HDDA) | 4.23 g (2.12 g, 10 wt % HDDA) | 0.0 g |
| 1,6-hexanediol diacrylate (HDDA) | 1.81 g (10 wt %) | 3.90 g (19 wt %) | 6.35 g (29 wt %) | 9.25 g (38 wt %) |
| Ethoxylated trimethylolpropane triacrylate | 2.35 g (12 wt %) | 2.53 g (12 wt %) | 2.75 g (12 wt %) | 3.00 g (12 wt %) |
| DAROCUR ® 1173 | 0.59 | 0.63 | 0.69 | 0.75 |

Hexanediol diacrylate was obtained from the UCB Chemicals Group. The Taber Abrasion results for Examples 2-5 are presented in Table 4.

TABLE 4

Taber Abrasion Results

| Cycles | Example 2 | Example 3 | Example 4 | Example 5 |
|---|---|---|---|---|
| 0 | 0.69 | 0.66 | 0.77 | 0.24 |
| 50 | 1.24 | 1.34 | 1.50 | 1.41 |
| 100 | 1.46 | 1.61 | 1.83 | 1.83 |
| 200 | 1.76 | 1.98 | 2.26 | 2.55 |
| 500 | 2.31 | 2.49 | 2.86 | 3.53 |

The reverse sided instrumented impact analysis for Examples 2-5 showed ductile behavior for all of the samples tested for each Example. The fracture energy averaged 35.4, 31.0, 36.1, and 33.9 ft. lbs., respectively, for Examples 2, 3, 4, and 5. The for Examples 2-5 tested in the MEK Double Rub test remained intact for 300 rubs, ing excellent chemical resistance.

Examples 6-16

Examples 6-16 were prepared, coated, cured, and analyzed bed in Example 1. The weight percentages of the coating components, presented in Table 5, were calculated based on the total weight of the composition and included the weight of the DAROCUR® 1173 photoinitiator.

Dipropylene glycol diacrylate available from UCB Chemicals. The coatings prepared in examples 6-16 were tested in the MEK Double Rub test as described in example 1. Each of the coatings tested remained intact for 300 rubs, thus showing excellent chemical resistance. The Taber Abrasion results for Examples 6-16 are presented in Table 6:

TABLE 6

| | Cycles | | | | |
|---|---|---|---|---|---|
| | 0 | 50 | 100 | 200 | 500 |
| Example 6 | 0.55 | 6.40 | 9.75 | 16.72 | 30.80 |
| Example 7 | 0.95 | 5.76 | 10.46 | 17.86 | 30.56 |
| Example 8 | 0.76 | 5.65 | 9.65 | 16.48 | 33.00 |
| Example 9 | 0.68 | 5.38 | 8.14 | 14.62 | 30.89 |
| Example 10 | 0.67 | 7.00 | 10.64 | 19.61 | 36.14 |
| Example 11 | 0.75 | 6.67 | 10.61 | 19.23 | 36.33 |
| Example 12 | 0.65 | 6.52 | 12.00 | 22.68 | 39.43 |
| Example 13 | 0.74 | 6.17 | 10.71 | 19.57 | 36.13 |
| Example 14 | 0.80 | 5.99 | 9.45 | 16.61 | 32.86 |
| Example 15 | 1.05 | 6.06 | 9.30 | 16.59 | 32.56 |
| Example 16 | 0.84 | 5.86 | 9.15 | 16.45 | 33.38 |

The coated samples for Examples 6-16 were tested in the reverse sided instrumented impact study as described in Example 1. For each of the Examples which exhibited 100% ductile failure, the average fracture energy was calculated. The results to this evaluation are presented in Table 7:

TABLE 5

| Monomer | 6 | 7 | 8 | 9 | 10 | 11 | 12 | 13 | 14 | 15 | 16 |
|---|---|---|---|---|---|---|---|---|---|---|---|
| EBECRYL ® 1290 | 15% | 16.1% | 13.6% | 15% | 15% | 15% | 19.8% | 17.4% | 11% | 19% | 23% |
| EBECRYL ® 3500 | 35% | 37.5% | 31.7% | 35% | 35% | 35% | 15% | 25% | 36.7% | 33.3% | 31.6% |
| Dipropylene glycol diacrylate (DPGDA) | 15% | 16.1% | 13.6% | 0% | 25% | 35% | 19.8% | 17.4% | 15.7% | 14.3% | 13.5% |
| 1,6-Hexanediol diacrylate (HDDA) | 20% | 21.3% | 18.1% | 35% | 10% | 0% | 26.5% | 23.3% | 21.0% | 19.0% | 18.0% |
| Ethoxylated trimethylol-propane triacrylate | 12% | 6% | 20% | 12% | 12% | 12% | 15.9% | 13.9% | 12.6% | 11.4% | 10.8% |
| DAROCUR ® 1173 | 3% | 3% | 3% | 3% | 3% | 3% | 3% | 3% | 3% | 3% | 3% |

TABLE 7

| Sample | Failure Mode | Fracture Energy |
|---|---|---|
| Example 6 | 4 Ductile/0 Brittle | 48.3 |
| Example 7 | 5 Ductile/0 Brittle | 36.2 |
| Example 8 | 5 Ductile/0 Brittle | 37.1 |
| Example 9 | 5 Ductile/0 Brittle | 41.4 |
| Example 10 | 5 Ductile/0 Brittle | 34.2 |
| Example 11 | 5 Ductile/0 Brittle | 38.6 |
| Example 12 | 5 Ductile/0 Brittle | 42.5 |
| Example 13 | 5 Ductile/0 Brittle | 35.7 |
| Example 14 | 5 Ductile/0 Brittle | 57.8 |
| Example 15 | 4 Ductile/1 Brittle | — |
| Example 16 | 1 Ductile/3 Brittle | — |

Example 17

Example 17 was prepared, coated, and cured in a manner identical to Example 5 except that the following stabilizing additives were added to the formulation: 2 weight % TINUVIN® 400 and 1 weight % TINUVIN® 123 (available from Ciba Specialty Chemicals). The weight percentages were based on the total weight of the coating composition. These additives, while compatible with the UV cure, improved the weatherability of the coating composition. The weatherability analysis was conducted on a QUV-SE Weathering Tester model QUV/se from Q-Panel Lab Products according to the ASTM method UVA-340 G154 Cycle 1. The weathering results from samples of this coating are presented in Table 8:

TABLE 8

| Exposure | Example 17 (b*) | Example 5 (b*) | Example 17 (% Haze) | Example 5 (% Haze) |
|---|---|---|---|---|
| 0 hours | 0.14 | 0.15 | 0.92 | 0.8- |
| 384 hours | 0.14 | 0.44 | 1.11 | 11.12 |
| 786 hours | 0.16 | 0.57 | 2.12 | 12.85 |
| 1152 hours | 0.50 | 1.22 | 2.77 | 14.31 |
| 1536 hours | 0.68 | 2.64 | 2.73 | 14.82 |
| 1920 hours | 0.71 | 4.36 | 2.45 | 15.19 |

The b* values were obtained from testing performed on a HunterLab UltraScan Sphere 8000 running Hunter's Universal software. The default testing conditions are D65 (daylight, 6500° K), Large Area View (1" diameter), Reflectance Mode, Specular Included, and 10° observer. Applicable ASTM methods include:

E 1164—Obtaining Spectrophotometric Data for Object-Color Evaluation

E 308—Computing the Colors of Objects by Using the CIE System. (This method covers the calculations for going from spectra and CIE standard observer and CIE standard illuminant to calorimetric property values like CIE L*, a*, b*.)

D 2244—Calculation of Color Differences

E 313—Yellowness and Whiteness Index

Comparative Examples 1 to 4

Comparative Examples 1-4 were prepared, coated, cured, and analyzed as described in Example 1. These coatings utilized Example 5 as the starting composition for analyzing the effect of varying the concentration of either HDDA or of EBECRYL® 3500 on the coating properties. The composition of these examples is presented in Table 9. The weight percentages are based on the total weight of the coating composition and include the weight of DAROCUR® 1173 photoinitiator.

TABLE 9

| | Example No. | | | |
|---|---|---|---|---|
| Monomer | Comparative Example 1 | Comparative Example 2 | Comparative Example 3 | Comparative Example 4 |
| EBECRYL® 1290 | 15.2% | 6.8% | 15.2% | 6.8% |
| EBECRYL® 3500 | 51.2% | 22.8% | 14% | 60% |
| Hexanediol diacrylate (HDDA) | 14% | 60% | 51.2% | 22.8% |
| Ethoxylated trimethylolpropane triacrylate | 16.6% | 7.4% | 16.6% | 7.4% |
| DAROCUR® 1173 | 3% | 3% | 3% | 3% |

TABLE 10

| Cycles | Comparative Example 1 Low HDDA | Comparative Example 2 High HDDA | Comparative Example 3 Low EBECRYL® 3500 | Comparative Example 4 High EBECRYL® 3500 |
|---|---|---|---|---|
| 0 | 0.6 | 0.7 | 0.7 | 0.9 |
| 50 | 2.0 | 11.2 | 15.8 | 5.5 |
| 100 | 2.4 | 19.9 | 24.0 | 7.0 |
| 200 | 3.1 | 31.2 | 30.9 | 9.7 |
| 500 | 5.4 | 43.0 | 44.6 | 21.4 |

The reverse sided instrumented impact results for Comparative Examples 1-4 are presented in Table 11:

TABLE 11

| Sample | Ductile:Brittle | Average Fracture Energy for Ductile Samples | Average Fracture Energy for Brittle Samples |
|---|---|---|---|
| Comparative Example 1 | 4:0 | 42.8 ft. lbs. | — |
| Comparative Example 2 | 3:2 | 43.2 ft. lbs. | 2.1 ft. lbs. |
| Comparative Example 3 | 1:3 | 42.8 ft. lbs. | 1.9 ft. lbs. |
| Comparative Example 4 | 5:0 | 43.2 ft. lbs. | — |

In the MEK double rub test, the coatings of Comparative Examples 2 and 3 remained intact for 300 cycles of rubbing. The coatings of Comparative Examples 1 and 4, however, failed after 100 cycles. In comparison with Example 5, none of Comparative Examples 1-4 pass both the MEK double rub test and the reverse sided impact test.

What is claimed is:

1. A coating composition for a thermoplastic substrate, comprising:
    (A) about 10 to about 60 weight percent of at least one flexible component comprising at least one diacrylate or dimethacrylate ester of a substituted or unsubstituted, linear or branched, diol selected from aliphatic diols containing 3 to about 18 carbon atoms, polyalkylene ether glycols containing 3 to 50 carbon atoms, and cycloaliphatic diols containing about 4 to about 18 carbon atoms;
    (B) about 10 to about 60 weight percent of at least one aromatic component comprising at least one diacrylate or dimethacrylate ester of a substituted or unsubstituted, linear or branched, diol having a backbone comprising at least one residue of a bisphenol; and (C) about 1 to about 25 weight percent of at least one aliphatic urethane acrylate;

wherein said substituted diols contain 1 to 8 substituents independently selected from halo, hydroxy, oxo, $C_1$-$C_{10}$ alkyl, $C_2$-$C_{10}$ alkenyl, $C_6$-$C_{10}$ aryl, and $C_1$-$C_{10}$ alkoxy, said composition has a weight ratio of flexible component:aromatic component of about 1:3 to about 3:1, and said weight percentages are based upon the total weight of said composition excluding any additives;

wherein said bisphenol comprises at least one compound selected from the following:

bisphenol, bisphenol A, bisphenol F, bisphenol S, bisphenol A epoxy diacrylates and diacrylate esters of ethoxylated bisphenol, propoxylated bisphenol, ethoxylated bisphenol A, propoxylated bisphenol A, ethoxylated bisphenol F, propoxylated bisphenol F, ethoxylated bisphenol S, propoxylated bisphenol S, bisphenol A epoxy diacrylate modified with at least one alkylene glycol or polyalkylene glycol containing 4 to 20 carbon atoms, one or more aliphatic dicarboxylic acids containing 2 to 20 carbon atoms, or a mixture thereof; and wherein said modified bisphenol A epoxy diacrylate comprises residues of at least one aliphatic dicarboxylic acid containing 4 to 8 carbon atoms and propylene glycol.

2. The composition according to claim 1 which is curable by radiation.

3. The composition according to claim 2 wherein said radiation comprises ultraviolet or electron beam radiation.

4. The composition according to claim 1 which comprises about 15 weight percent to about 55 weight percent each of said flexible component (A) and aromatic component (B).

5. The composition according to claim 4 which comprises about 20 weight percent to about 50 weight percent each of said flexible component (A) and aromatic component (B).

6. The composition according to claim 1 wherein said weight ratio is about 1:2 to about 2:1.

7. The composition according to claim 1 wherein said weight ratio is about 1:1.5 to about 1.5:1.

8. The composition according to claim 3 wherein said flexible component (A) comprises at least one diacrylate or dimethacrylate ester of at least one diol selected from the following: diethylene glycol; 1,2-propanediol; dipropylene glycol; 1,3-propanediol; 2,2-dimethyl-1,3-propanediol; 1,3-butanediol; decamethylene glycol; 1,4-butanediol; 1,5-pentanediol; 1,6-hexanediol; polyethylene glycol; polypropylene glycol; 2,2,4-trimethyl-1,6-hexanediol; thiodiethanol; 1,3-cyclohexanedimethanol; 1,4-cyclohexanedimethanol; 2,2,4,4-tetramethyl-1,3-cyclobutanediol; triethylene glycol; trimethylolpropane; tripropylene glycol; polycaprolactone diol; polyether polyols having a molecular weight of up to about 3000; tetraethylene glycol; 2,2-bis(4-hydroxycyclohexyl)propane; and alkoxide adducts thereof.

9. The composition according to claim 8 wherein said flexible component (A) comprises at least one diacrylate ester selected from the following: 1,4-cyclohexane-dimethanol diacrylate; ethylene glycol diacrylate; diethylene glycol diacrylate; triethylene glycol diacrylate; polyethylene glycol diacrylate; polypropylene glycol diacrylate; dipolypropylene glycol diacrylate; trimethylolpropane diacrylate; ethoxylated trimethylolpropane diacrylate; propoxylated trimethylolpropane diacrylate; propoxylated neopentyl glycol diacrylate; ethoxylated neopentyl glycol diacrylate; tripolypropylene glycol diacrylate; tripolypropylene glycol diacrylate; 1,4-butanediol diacrylate; 1,3-propanediol diacrylate; 2,2-dimethyl-1,3-propanediol diacrylate; 1,6-hexanediol diacrylate; and pentaerythritol diacrylate.

10. The composition according to claim 9 wherein said flexible component (A) comprises 1,6-hexanediol diacrylate.

11. A coating composition for a thermoplastic substrate, comprising:

(A) about 10 to about 60 weight percent of at least one flexible component comprising at least one diacrylate or dimethacrylate ester of a substituted or unsubstituted, linear or branched, diol selected from aliphatic diols containing 3 to about 18 carbon atoms, polyalkylene ether glycols containing 3 to 50 carbon atoms, and cycloaliphatic diols containing about 4 to about 18 carbon atoms;

(B) about 10 to about 60 weight percent of at least one aromatic component comprising at least one diacrylate or dimethacrylate ester of a substituted or unsubstituted, linear or branched, diol having a backbone comprising at least one residue of a bisphenol; and (C) at least one urethane acrylate;

wherein said substituted diols contain 1 to 8 substituents independently selected from halo, hydroxy, oxo, $C_1$-$C_{10}$ alkyl, $C_2$-$C_{10}$ alkenyl, $C_6$-$C_{10}$ aryl, and $C_1$-$C_{10}$ alkoxy, said composition has a weight ratio of flexible component:aromatic component of about 1:3 to about 3:1, and said weight percentages are based upon the total weight of said composition excluding any additives, wherein said bisphenol comprises at least one compound selected from the following: bisphenol, bisphenol A, bisphenol F, bisphenol S, bisphenol A epoxy diacrylates and diacrylate esters of ethoxylated bisphenol, propoxylated bisphenol, ethoxylated bisphenol A, propoxylated bisphenol A, ethoxylated bisphenol F, propoxylated bisphenol F, ethoxylated bisphenol S, propoxylated bisphenol S, and bisphenol A epoxy diacrylate modified with at least one alkylene glycol or polyalkylene glycol containing 4 to 20 carbon atoms, one or more aliphatic dicarboxylic acids containing 2 to 20 carbon atoms, or a mixture thereof, wherein said modified bisphenol A epoxy diacrylate comprises residues of at least one aliphatic dicarboxylic acid containing 4 to 8 carbon atoms and propylene glycol.

12. The composition according to claim 1 wherein said bisphenol A epoxy diacrylate has the formula:

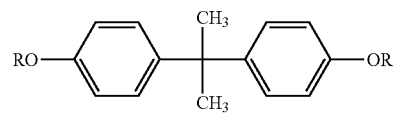

wherein R is a radical having the formula:

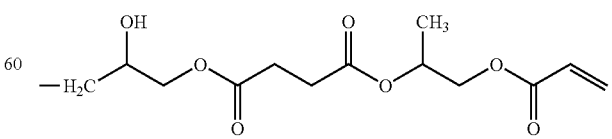

13. The composition according to claim 1 which comprises about 5 to about 20 weight percent of said urethane acrylate.

14. The composition according to claim 1 wherein said aliphatic urethane acrylate comprises at least one hexafunctional aliphatic urethane acrylate.

15. The composition according to claim 13 which further comprises at least one multifunctional acrylate selected from the following: trimethylolpropane triacrylate, ethoxylated trimethylolpropane triacrylate, glycerol triacrylate, ethoxylated glycerol triacrylate, propoxylated glycerol triacrylate, pentaerythritol triacrylate, ethoxylated pentaerythritol triacrylate, propoxylated pentaerythritol triacrylate, pentaerythritol tetraacrylate, ethoxylated pentaerythritol tetraacrylate, propoxylated pentaerythritol tetraacrylate, dipentaerythritol hexaacrylate, ethoxylated dipentaerythritol hexaacrylate, and propoxylated dipentaerythritol hexaacrylate.

16. The composition according to claim 15 wherein said multifunctional acrylate comprises at least one ethoxylated trimethylolpropane triacrylate containing 3 to 20 ethoxy groups.

17. The composition according to claim 1 which further comprises $SiO_2$ dispersed therein.

18. The composition according to claim 2 which further comprises at least one photoinitiator selected from the following: 2,2-dimethoxy-1,2-diphenyl-1-ethanone; 2-hydroxy-2-methylpropiophenone; benzoin methyl ether; benzoin ethyl ether; benzoin isopropyl ether; benzoin phenyl ether; benzoin acetate; acetophenone; 2,2-dimethoxyacetophenone; 4-(phenylthio)acetophenone; 1,1-dichloroacetophenone; benzil; benzil dimethyl ketal; benzil diethyl ketal; 2-methylanthraquinone; 2-ethylanthraquinone; 2-tert-butylanthraquinone; 1-chloroanthraquinone; 2-amylanthraquinone; 2,4,6-trimethylbenzoyldiphenylphosphine oxide; benzophenone; 4,4'-bis(N,N'-dimethylamino)benzophenone; thioxanthones; 1-phenyl-1,2-propanedione-2-O-benzoyloxime; 1-aminophenyl ketones; 1-hydroxycyclohexyl phenyl ketone; phenyl (1-hydroxyisopropyl)ketone; 4-isopropylphenyl(1-hydroxyisopropyl)ketone; and chloroalkyl-S-triazines.

19. The composition according to claim 18 wherein said photoinitiator comprises 2-hydroxy-2-methylpropiophenone.

20. A coating composition for a thermoplastic substrate, comprising:
(A) about 20 to about 50 weight percent of a flexible component comprising at least one diacrylate ester selected from the following: 1,4-cyclohexanedimethanol diacrylate, ethylene glycol diacrylate, diethylene glycol diacrylate, triethylene glycol diacrylate, polyethylene glycol diacrylate, polypropylene glycol diacrylate, dipolypropylene glycol diacrylate, tripolypropylene glycol diacrylate, 1,4-butanediol diacrylate, 1,3-propanediol diacrylate, 2,2-dimethyl-1,3-propanediol diacrylate, 1,6-hexanediol diacrylate, and pentaerythritol diacrylate;
(B) about 15 to about 40 weight percent of an aromatic component comprising at least one bisphenol A epoxy diacrylate;
(C) about 5 to about 20 weight percent of at least one aliphatic urethane acrylate comprising the residues of at least one polyhydroxy compound selected from the following: trimethylolpropane, glycerol, pentaerythritol, and dipentaerythritol; and
(D) about 5 to about 25 weight percent of at least one multifunctional acrylate selected from the following: trimethylolpropane triacrylate, ethoxylated glycerol triacrylate, propoxylated glycerol triacrylate, pentaerythritol triacrylate, pentaerythritol tetraacrylate, dipentaerythritol hexaacrylate, propoxylated trimethylolpropane triacrylate, and ethoxylated trimethylolpropane triacrylate;
wherein said weight percentages are based on the total weight of said composition excluding any additives.

21. The composition according to claim 20 further comprising at least one photoinitiator.

22. The composition according to claim 21 which comprises
(A) about 20 to about 40 weight percent of a flexible component comprising dipropylene glycol diacrylate and 1,6-hexanediol diacrylate;
(B) about 15 to about 40 weight percent of a bisphenol A epoxy acrylate modified with at least one alkylene glycol or polyalkylene glycol containing 4 to 20 carbon atoms, one or more aliphatic dicarboxylic acids containing 4 to 20 carbon atoms, or a mixture thereof
(C) about 5 to about 15 weight percent of at least one aliphatic urethane acrylate comprising the residues of pentaerythritol; and
(D) about 5 to about 20 weight percent of a multifunctional acrylate comprising ethoxylated trimethylolpropane triacrylate containing 3 to 20 ethoxy groups.

23. The composition according to claim 22 further comprising $SiO_2$ dispersed therein.

24. The composition according to claim 23 wherein said modified bisphenol epoxy acrylate has the formula:

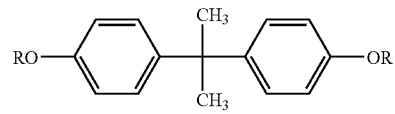

wherein R is a radical having the formula:

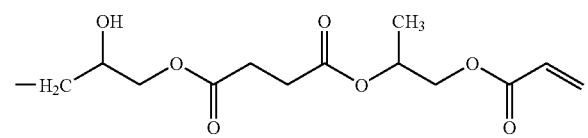

25. The composition according to claim 24 further comprising a UV absorber or hindered amine light stabilizer.

26. A shaped article comprising the composition of claim 21 applied to at least one surface thereof and cured by exposure to ultraviolet or electron beam radiation.

27. The shaped article according to claim 26 which comprises at least one thermoplastic polymer selected from the following: polyester, polyamide, polycarbonate, cellulosic, polyolefin, polysulfone, polyacetal, polyimide, polyketone, polylactic acid, copolymers thereof, and blends thereof.

28. The shaped article according to claim 27 which comprises one or more layers.

29. The shaped article according to claim 27 wherein said thermoplastic polymer comprises at least one polyester.

30. The shaped article according to claim 29 wherein said polyester comprises one or more polyesters selected from the following: poly(ethylene terephthalate), poly(butylene terephthalate), poly(1,3-trimethylene terephthalate), and poly(cyclohexylene terephthalate).

31. The shaped article according to claim 29 where said polyester comprises (i) diacid residues comprising at least 80 mole percent, based on the total moles of diacid residues, of the residues of one or more dicarboxylic acids selected from: terephthalic acid, naphthalenedicarboxylic acid, 1,4-cyclohexanedicarboxylic acid, and isophthalic acid; and (ii) diol residues comprising about 3 to about 100 mole percent, based on the total moles of diol residues, of the residues of one or more diols selected from 1,4-cyclohexanedimethanol, neopentyl glycol, and diethylene glycol; and 0 to 97 mole percent of the residues of one or more of diols selected from: ethylene glycol; 1,2-propanediol; 1,3-propanediol; 1,4-butanediol; 1,5-pentanediol; 1,6-hexanediol; 1,8-octanediol; 2,2,4-trimethyl-1,3-pentanediol; 2,2,4,4-tetramethyl-1,3-cyclobutanediol; 1,3-cyclohexanedimethanol; bisphenol A; and polyalkylene glycol.

32. The shaped article according to claim 31 wherein said diacid residues comprise at least 95 mole percent of the residues of terephthalic acid; said the diol residues comprise about 10 to about 40 mole percent of the residues of 1,4-cyclohexanedimethanol, about 1 to about 25 mole percent of the residues of diethylene glycol, and about 35 to about 89 mole percent of the residues ethylene glycol.

33. The shaped article according to claim 32 wherein said diacid residues comprise from about 60 to about 100 mole percent terephthalic acid and 0 to about 40 mole percent isophthalic acid.

34. The shaped article according to claim 31 wherein said article is produced by extrusion, calendering, thermoforming, blow-molding, injection molding, casting, tentering, or blowing.

35. The shaped article according to claim 34 wherein article is a sheet, film, tube, bottle, or profile.

36. The shaped article according to claim 35 which is a film or sheet having a haze value of 20% or less after 100 cycles in accordance with ASTM procedure D1044.

37. The shaped article of claim 36 which exhibits a haze value of 15% or less after 100 cycles in accordance with ASTM procedure D1044.

38. The shaped article of claim 37 which exhibits solvent resistance after 300 methyl ethyl ketone double rubs in accordance with ASTM Procedure D3732.

39. A method of coating a shaped article comprising applying the coating composition of claim 22 to a surface of a shaped article and exposing said surface to radiation.

* * * * *